US008387047B1

(12) United States Patent
Mazin et al.

(10) Patent No.: US 8,387,047 B1
(45) Date of Patent: Feb. 26, 2013

(54) METHOD OF VIRTUALIZING FILE EXTENSIONS IN A COMPUTER SYSTEM BY DETERMINING AN ASSOCIATION BETWEEN APPLICATIONS IN VIRTUAL ENVIRONMENT AND A FILE EXTENSION

(75) Inventors: Yury Mazin, Palo Alto, CA (US); Ryan M. McCarten, Redwood City, CA (US)

(73) Assignee: Symantec Corporation, Mountain View, CA (US)

( * ) Notice: Subject to any disclaimer, the term of this patent is extended or adjusted under 35 U.S.C. 154(b) by 776 days.

(21) Appl. No.: 12/534,771

(22) Filed: Aug. 3, 2009

(51) Int. Cl.
*G06F 9/455* (2006.01)
*G06F 9/46* (2006.01)

(52) U.S. Cl. ............................................. 718/1; 718/100
(58) Field of Classification Search .................... None
See application file for complete search history.

(56) References Cited

U.S. PATENT DOCUMENTS

| | | |
|---|---|---|
| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |

(Continued)

FOREIGN PATENT DOCUMENTS

| | | |
|---|---|---|
| WO | WO97/00475 | 1/1997 |
| WO | WO97/46955 | 12/1997 |

(Continued)

OTHER PUBLICATIONS

Yang Yu, et al: "A Feather-weight Virtual Machine for Windows Applications"; Jun. 14, 2006; pp. 24-34.

(Continued)

*Primary Examiner* — Meng An
*Assistant Examiner* — Tammy Lee
(74) *Attorney, Agent, or Firm* — Rory D. Rankin; Meyertons, Hood, Kivlin, Kowert & Goetzel, P.C.

(57) ABSTRACT

A system and method for virtualizing file extensions. The system includes a system environment, one or more virtual environments, and a shell extension. The shell extension detects a request to perform an action on a file in the system environment. The file has an associated file extension. The system environment includes applications for opening files. In response to detecting the request, the shell extension determines that the action is to open the file in the system environment and the file extension is not associated with any of the applications in the system environment. The shell extension queries the virtual environments to find an association between the file extension and an application, identifies at least one of the virtual environments in which the extension is associated with an application, and opens the file in a selected virtual environment.

17 Claims, 7 Drawing Sheets

U.S. PATENT DOCUMENTS

| | | | |
|---|---|---|---|
| 5,978,788 | A | 11/1999 | Castelli et al. |
| 5,978,791 | A | 11/1999 | Farber et al. |
| 6,003,087 | A | 12/1999 | Housel, III et al. |
| 6,009,410 | A | 12/1999 | LeMole et al. |
| 6,073,129 | A | 6/2000 | Levine et al. |
| 6,088,524 | A | 7/2000 | Levy et al. |
| 6,122,628 | A | 9/2000 | Castelli et al. |
| 6,311,221 | B1 | 10/2001 | Raz et al. |
| 6,363,400 | B1 * | 3/2002 | Chtchetkine et al. ............... 1/1 |
| 7,735,057 | B2 | 6/2010 | Rachman et al. |
| 2004/0172443 | A1 * | 9/2004 | Alcazar et al. ............... 709/200 |
| 2004/0230971 | A1 | 11/2004 | Rachman et al. |
| 2005/0108678 | A1 * | 5/2005 | Goodwin et al. ............ 717/100 |
| 2006/0085789 | A1 * | 4/2006 | Laborczfalvi et al. ........ 718/100 |
| 2006/0173805 | A1 * | 8/2006 | Clifford et al. .................. 707/1 |
| 2007/0043700 | A1 * | 2/2007 | Dawson et al. .................. 707/3 |
| 2008/0010630 | A1 | 1/2008 | Ou-Yang et al. |
| 2008/0098391 | A1 * | 4/2008 | Medvedev et al. ............... 718/1 |
| 2009/0070405 | A1 * | 3/2009 | Mazzaferri .................. 709/202 |
| 2010/0235831 | A1 * | 9/2010 | Dittmer ............................. 718/1 |

FOREIGN PATENT DOCUMENTS

| | | |
|---|---|---|
| WO | WO98/11723 | 3/1998 |

OTHER PUBLICATIONS

Japanese Patent Application Laid-open No. Hei 10-133976.
Japanese Patent Application Laid-open No. Sho 64-36332.
Japanese Patent Application Laid-open No. Hei 10-162057.
G. Glass, "A Universal Streaming Service", C++ Report, Apr. 1996, pp. 74-76 and 81-83.
T. Ritchey, "Java!", New Riders Publishing, Dec. 1995, pp. 214-216.
Chen, Z. et al., (Dec. 11-14, 1995) "Real time video and audio in the world wide web" World Wide Web Journal, Fourth International World Wide Web Conference, pp. 333-348.
Jiang, Z. and Kleinrock, L. (1997) "Prefetching links on the WWW" IEEE International Conference on Communications (ICC), US, New York, NY: IEEE, pp. 483-489.
M. Schwartz, "Telecommunication Networks: Protocols, Modeling and Analysis", Jan. 1, 1987; Addison-Wesley Publishing Company, pp. 266-283.
J. Basu et al., "Degrees of Transaction Isolation in SQL *Cache: A Predicate-based Client-side Caching System", May 15, 1996, pp. 1-22.
Amit Shukla et al., "Storage Estimation for Multidimensional Aggregates in the Presence of Hierarchies", VLDB Conference Mumbai (Bombay), 1996, pp. 522-531.
Dale Skeen, "New Forms of Persistent Queries Are Necessary to Handle Live Business Data As It Speeds Through a Company", internet website byte.com BYTE Magazine, Feb. 1998, 5pgs.
V. Hoff et al., "The Open Software Description Format (OSD)", internet website w3.org, Aug. 11, 1997, pp. 1-13.
Red Brick Vista, "Aggregate Computation and Management", internet website informix.com, printed Oct. 4, 2000.
Fireclick, "Web Site Performance is Key to E-Commerce Sucess", internet website. Fireclick.com printed, Nov. 1, 2000.
Boost Web Optimizer Technology Overview, "How it Works", Sep. 27, 2000 and internet website boostworks.com printed Nov. 1, 2000.
"Delivering Windows to the Net White Paper", WinToNet by Menta Software, 2000 and Website http://216.205.21.102/ printed Nov. 1, 2000.
"First There was Streaming Audio, then Streaming Video. Now get ready for Streaming Software", Stream Theory White paper and Website Streamtheory.com printed Sep. 22, 2000.
"OSD Describing Software Package on the Internet", Marimba Inc. White paper 1998 and wedsite marimba. com, printed Nov. 1, 2000.
"Timbale for Windows Terminal Services" Marimba Promotional document, undated, 2000.
Japanese Patent Application Laid-open No. Hei 8-51596.
Japanese Patent Application Laid-open No. Hei 10-91446.
Japanese Patent Application Laid-open No. Hei 7-271603.
Japanese Patent Application Laid-open No. Hei 8-6878.

* cited by examiner

METHOD OF VIRTUALIZING FILE EXTENSIONS IN A COMPUTER SYSTEM BY DETERMINING AN ASSOCIATION BETWEEN APPLICATIONS IN VIRTUAL ENVIRONMENT AND A FILE EXTENSION

BACKGROUND OF THE INVENTION

1. Field of the Invention

This invention relates to opening files in a computer system. More particularly, the invention relates to a system and method for opening files using applications in a virtualized environment.

2. Description of the Related Art

Files in computer systems generally have an associated file extension that may be further associated with an application to be used to open the file. For example, when a common user action such as a double-click is performed on a file, the file's extension may be used to identify a previously associated application to be launched and then used to open the file. If a file's extension is not associated with an application, a user may be prompted to select or browse for an application to be used to open the file.

Unfortunately, in virtualized environments, even though an application may be associated with a file in one virtual environment, the association may not be known to other virtual environments or to the physical operating system environment. Consequently, even though a user may have access to an associated application for a particular file extension type, if the user attempts to open the file in the physical operating system environment, the user may be presented with an unfamiliar and daunting set of options. Accordingly, what is needed are systems and methods of handling file extensions and their associations in virtualized environments that minimize changes to the expected user experience.

SUMMARY OF THE INVENTION

Various embodiments of a system and method for virtualizing file extensions are contemplated. According to some embodiments, the system may include a system environment, one or more virtual environments, and a shell extension. The shell extension detects a request to perform an action on a file in the system environment. The file has an associated file extension. The system environment includes applications for opening files. In response to detecting the request, the shell extension determines that the action is to open the file in the system environment and the file extension is not associated with any of the applications in the system environment. The shell extension queries the virtual environments to find an association between the file extension and an application, identifies at least one of the virtual environments in which the extension is associated with an application, and opens the file in a selected virtual environment.

In one embodiment, the shell extension is registered with an operating system shell and the operating system shell conveys a notification to the registered shell extension when a request to perform an action on a file is made. The operating system shell delays processing the request until a return status is received from the registered shell extension and continues processing the request in response to receiving a return status of false from the registered shell extension. In a further embodiment, the notification includes information identifying the file extension and information identifying the action.

In a still further embodiment, to open the file in the selected virtual environment, the shell extension creates a processing thread in the system environment, moves the processing thread to the selected virtual environment, and triggers the processing thread to open the file in the selected virtual environment. In a still further embodiment, the shell extension returns a status of false if the action is not to open a file whose associated file extension is not associated with any of the applications in the system environment and if the shell extension can not identify at least one of the virtual environments in which the extension is associated with an application.

Also contemplated is a method of virtualizing file extensions in a host computer system that includes detecting a request to perform an action on a file in a system environment. The file has an associated file extension. The system environment includes applications for opening files. The method further includes in response to detecting the request, determining that the action is to open the file in the system environment and the file extension is not associated with any of the applications in the system environment. The method further includes querying one or more virtual environments to find an association between the file extension and an application, identifying at least one virtual environment in which the file extension is associated with an application, and opening the file in a selected virtual environment.

In a still further embodiment, a computer-accessible storage medium stores program instructions executable by a computer system to detect a request to perform an action on a file in a system environment. The file has an associated file extension and the system environment includes applications for opening files. The program instructions are further executable to in response to detecting the request, determine that the action is to open the file in the system environment and the file extension is not associated with any of the applications in the system environment. The program instructions are further executable to query one or more virtual environments to find an association between the file extension and an application, identify at least one virtual environment in which the file extension is associated with an application, and open the file in a selected virtual environment.

These and other embodiments will become apparent upon consideration of the following description and accompanying drawings.

Figure 1:
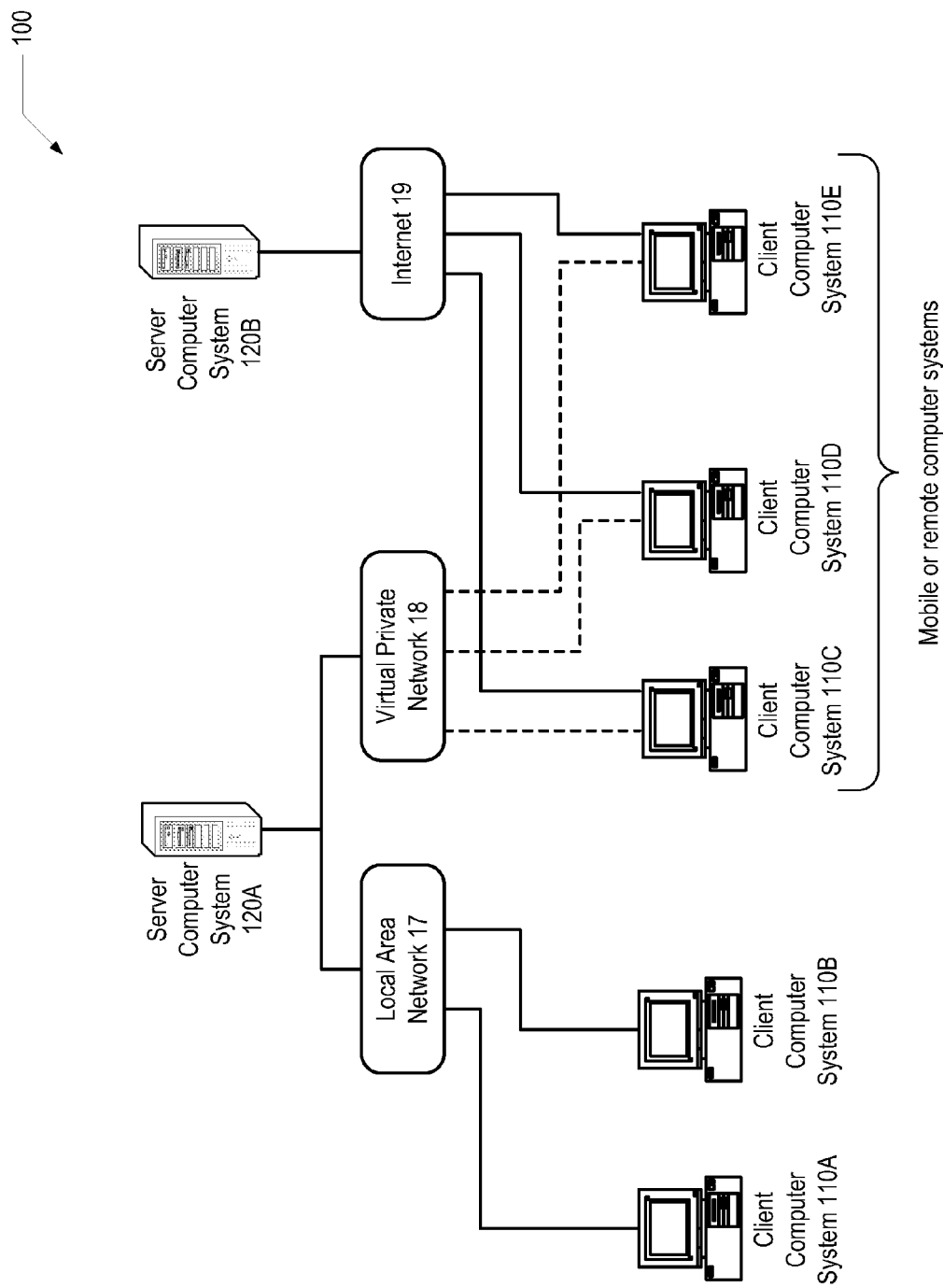
FIG. 1 illustrates one embodiment of a computer system in which file extensions may be virtualized.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for virtualizing file extensions are described herein. Virtualization may be used in client and server computer systems to fully or partially decouple software, such as an OS, from a system's hardware and provide an end-user with an illusion of multiple OSes running on a same machine each having its own resources. A virtualized environment, as used herein, is a group of resources and services that are provided to applications that would normally be provided by a physical operating system that are instead provided by an intermediate layer between the applications and the physical operating system. Generally speaking, from an application's point of view, there may be no detectable differences between a physical operating system environment and a virtual environment. However, an application running in a virtual environment may be isolated from other applications running in other virtual environments or in the physical operating system environment. In addition, an application running in a virtual environment may be prevented from affecting the configuration of the physical operating system environment.

FIG. 1 illustrates one example of such a system 100 in which file extensions may be virtualized. In the embodiment shown, system 100 includes client computer systems 110A-110E and server computer systems 120A and 120B. As used herein, elements referred to by a reference numeral followed by a letter may be collectively referred to by the numeral alone. For example, client computer systems 110A-110E may be collectively referred to as client computer systems 110. Client computer systems 110 and server computer systems 120 may be interconnected through various network elements. For example, client computer systems 110A and 110B are shown coupled to server computer system 120A via a local area network 17, client computer systems 110C, 110D, and 110E are shown coupled to server computer system 120A via a virtual private network 18 and to server computer system 120B via Internet 19. In this embodiment, client computer systems 110C-110E may be mobile and/or remote computer systems. In various embodiments the system may include any number and any type of client computer systems 110 and/or server computer systems 120. Client computer systems 110 are representative of any number of stationary computers and/or mobile computing devices such as laptops, handheld computers, television set top boxes, home media centers, telephones, etc. Client computer systems 110 and server computer systems 120 may operate as peers in a peer-to-peer configuration or as clients and servers in a client/server configuration, or a combination or peer-to-peer and client/server configurations. Each client computer 110 may, for example, be used by a particular user or member of a business or other organization, a home user(s), or otherwise.

In alternative embodiments, the number and type of computer systems and network elements is not limited to those shown in FIG. 1. Almost any number and combination of server, desktop, and mobile computer systems or devices may be interconnected in system 100 via various combinations of modem banks, direct LAN connections, wireless connections, WAN links, etc. Also, at various times one or more computer systems may operate offline. In addition, during operation, individual computer system connection types may change as mobile users travel from place to place connecting, disconnecting, and reconnecting to system 100. In one embodiment, computer system 100 or a portion thereof may be implemented as part of a cloud computing environment.

During operation, each of the client computer systems 110 and/or server computer systems 120 may obtain, install, and execute one or more of software applications in either a physical operating system environment or in a virtual environment. For example, software applications may include e-mail, word processing, spreadsheet, and other office productivity applications, specialized applications for handling graphics, images, audio files, video files, performing numeric calculations and the like. Numerous other software applications are known and are contemplated.

Figure 2:
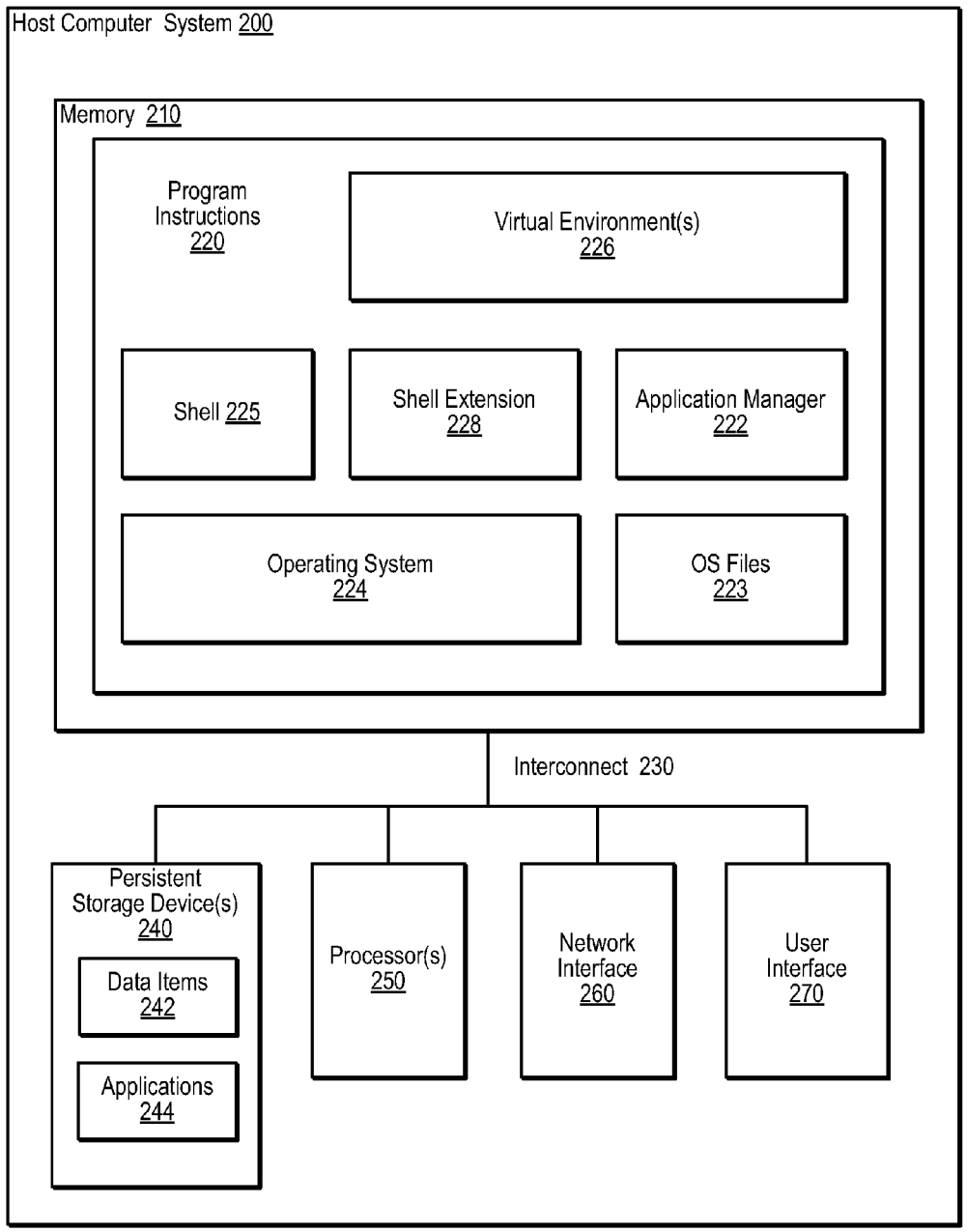
FIG. 2 illustrates one embodiment of a host computer system.

FIG. 2 illustrates one embodiment of a host computer system 200. It is noted that FIG. 2 is provided as an example for purposes of discussion, and in other embodiments the host computer system 200 may take on various other forms. Host computer system 200 may be representative of any of server computer systems 120 or client computer systems 110 described herein. Similarly, host computer system 200 may be used to implement any of the below-described methods. Host computer system 200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Host computer system 200 may include one or more processors 250, each of which may include one or more cores, any of which may be single or multi-threaded. Host computer system 200 may also include one or more persistent storage devices 240 (e.g. optical storage, magnetic storage, hard drive, tape drive, solid state memory, etc), which may include various data items 242 (e.g., files), and/or applications 244. Example applications include databases, email applications, office productivity applications, and a variety of others as known in the art. Host computer system 200 may include one or more memories 210 (e.g., one or more of cache, SRAM, DRAM, RDRAM, EDO RAM, DDR 10 RAM, SDRAM, Rambus RAM, EEPROM, etc.). Host computer system 200 may also include one or more network interfaces 260 for transmitting and receiving data, such as to or from client computer systems 110 or server computer systems 120, as described herein. Host computer system 200 may further include one or more user interfaces 270 for receiving user input or displaying output to users, such as a keyboard, mouse or other pointing device, touch screen, and a monitor or other visual display device. Various embodiments may include fewer or additional components not illustrated in FIG. 2 (e.g., video cards, audio cards, additional network interfaces, peripheral devices, a network interface such as an ATM interface, an Ethernet interface, a Frame Relay interface, etc.).

One or more of the system memories 210 may contain program instructions 220. Program instructions 220 may be encoded in platform native binary, any interpreted language such as Java® byte-code, or in any other language such as C/C++, Java®, etc or in any combination thereof. According to the illustrated embodiment, program instructions 220 may comprise specific modules executable to implement one or more operating systems 224, such as the Windows® operating system, the Solaris® operating system, and/or the Linux® operating system. In addition, program instructions 220 may include modules to implement one or more of an application manager 222, operating system files 223, an operating system shell 225, a shell extension 228, and one or more virtual environments 226. Operation of these modules will be described in further detail below. Program code included in program instructions 220 can be combined together or separated into various modules as desired, according to a particular embodiment.

During operation, a user or a process may attempt to open a file from data items 242 that requires use of a particular one of applications 244. For example, a user may attempt to open a particular file such as by double-clicking on the file. Shell 225 may receive an input corresponding to the user action and if operating system 224 includes a registered association between the particular application and the particular file, launch the particular application and open the file. Otherwise, shell 225 may present a dialog to the user from which to search for an application that may be used to open the particular file. If, however, a virtual environment 226 includes a registered association between the particular application and the particular file, additional actions may be taken using shell 225, shell extension 228, and application manager 222 as described further below according to a particular embodiment.

Figure 3:
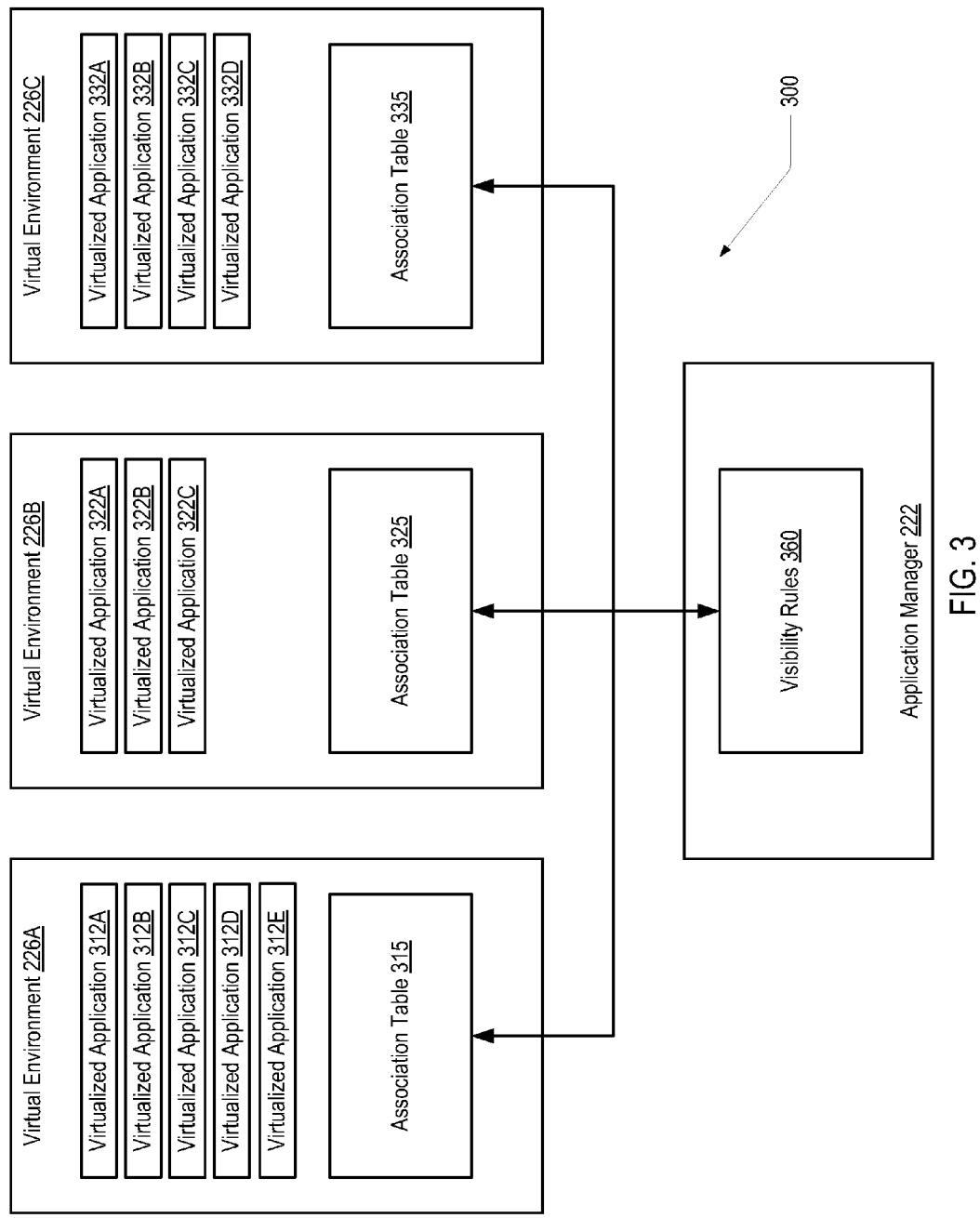
FIG. 3 is a block diagram of a system providing visibility into file extension associations in virtual environments.

In one embodiment, application manager 222 may be configured to provide visibility into one or more of virtual environments 226 including visibility into registered associations between applications and file extensions within these virtual environments. FIG. 3 is a block diagram of a system 300 providing visibility into file extension associations in virtual environments. In the illustrated embodiment, an application manager (e.g., application manager 222 of FIG. 2) and virtual environments 226A, 226B, and 226C are shown. Each virtual environment includes one or more virtualized applications. For example, in this embodiment, virtual environment 226A includes virtualized applications 312A-312E, virtual environment 226B includes virtualized applications 322A-322C, and virtual environment 226C includes virtualized applications 332A-332D. In addition, each virtual environment may include an association table. For example, in this embodiment, virtual environment 226A includes association table 315, virtual environment 226B includes association table 325, and virtual environment 226C includes association table 335. Association table 315 provides a list of files extensions that are associated with each of registered virtualized applications 312A-312E. For instance, assuming virtualized application 312A is a Microsoft Word application, association table 315 may include an entry that lists file extensions ".doc", ".txt", and ".docx" as having associations with Microsoft Word. Association tables 325 and 335 provide similar lists for the virtualized applications that are registered in virtual environments 226B and 226C, respectively.

Application manager 222, as illustrated in FIG. 3, may include a visibility rules module 360 coupled to association tables 315, 325, and 335. During operation, application manager 222 may access the information contained in association tables 315, 325, and 335 according to one or more access and/or selection rules included in visibility rules 360. For example, visibility rules 360 may specify in what order application manager 222 should query association tables 315, 325, and 335. Alternatively, visibility rules 360 may specify circumstances under which one or more of association tables 315, 325, and 335 are or are not accessible to application manager 222. In some embodiments, visibilities rules 360 may be used to filter results returned from association tables 315, 325, and 335. Accordingly, when a user attempts to open a file and the file's extension does not have a registered association in the physical system environment, visibility rules 360 may determine which file extension associations within virtual environments 226A-226C are accessible to be matched to the file's extension.

Figure 4:
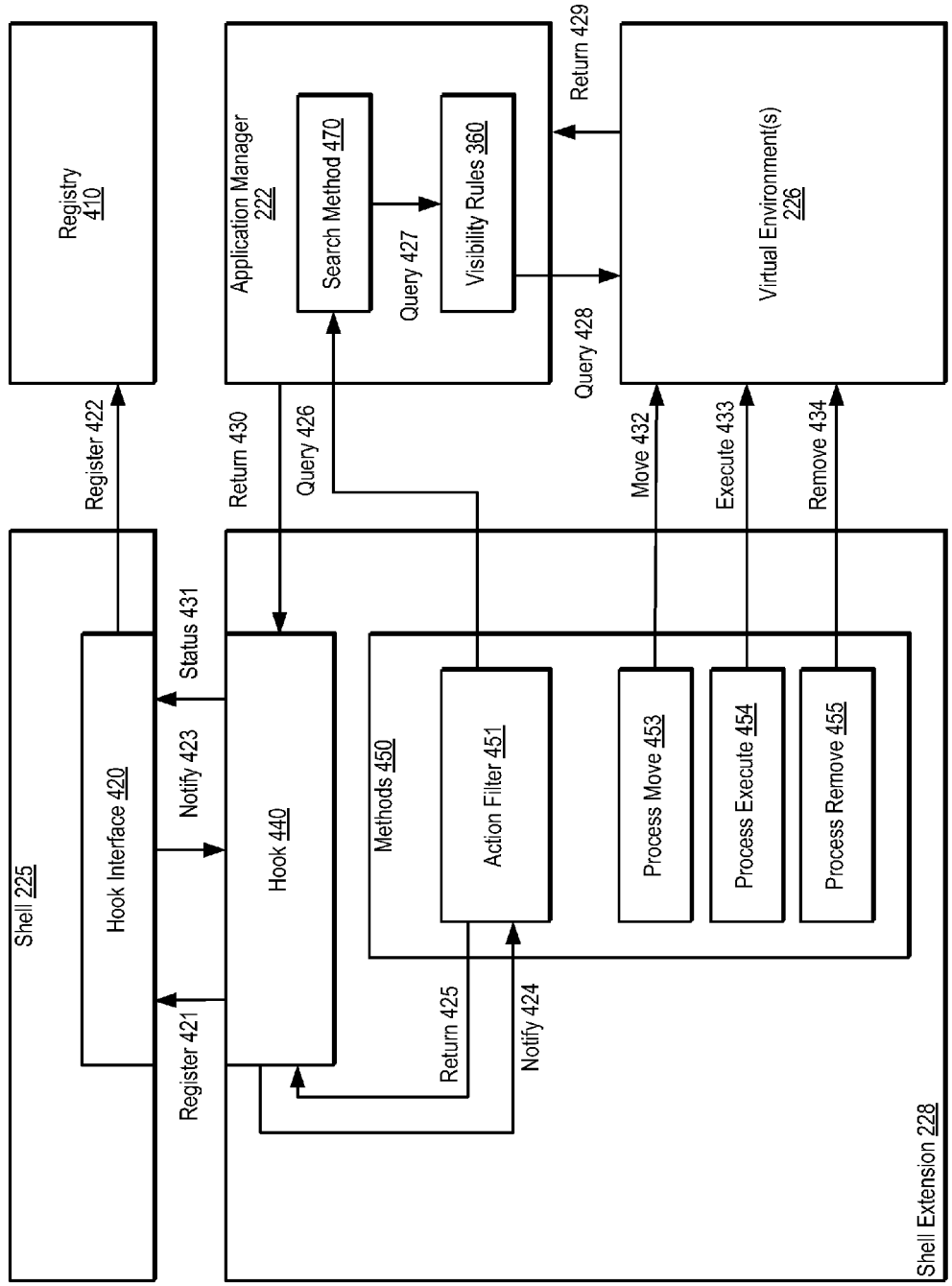
FIG. 4 is a block diagram illustrating one embodiment of components for finding a registered file extension association in a virtual environment.

Turning now to FIG. 4, a block diagram illustrating one embodiment of components for finding a registered file extension association in a virtual environment is shown. This embodiment includes shell 225, shell extension 228, application manager 222, virtual environment(s) 226, and a registry 410 that is associated with a physical operating system environment (not shown). Virtual environment(s) 226 have been described previously in connection with FIG. 2. Shell 225 represents a user interface provided by an operating system. Shell 225 may include a command-line interface and/or a graphical user interface through which a user may access functions of the operating system, in this case, a physical operating system. In this embodiment, shell 225 includes a hook interface 420. Shell extension 228 is software component that may provide features to allow for automatic discovery of file extension associations that are registered in one or more virtual environments. In this embodiment, shell extension 228 includes a hook 440, methods 450, and an extension table 460. Application manager 222 has been described in connection with FIG. 2 and FIG. 3 above and may include features that are used to search for a file extension association in a virtual environment including, in this embodiment, a search method 470 and visibility rules 360. Registry 410 is a database of information settings for the physical operating system.

During operation, shell 225 may provide a user with a variety of ways to open files. For example, a Microsoft Windows operating system shell may provide a graphical representation of a file such as an icon or a list item, such as may be seen via a Windows Explorer window. A user may double-click on the icon or list item to open the corresponding file. The Microsoft Windows operating system shell provides alternative methods for opening a file such as through a start menu. Other operating system may provide similar mechanisms. If a user attempts to open a file that has a known extension, i.e., the extension is associated with an application that is known by the operating system shell to be available, the file may be opened directly. However, if a user attempts to open a file that has an unknown extension, i.e., the extension is not associated with any application that is known by the operating system shell to be available, the operating system shell may present a dialog to the user from which to choose an application with which to open the file. In addition to providing a mechanism for a user to open a file, in one embodiment, shell 225 may provide a mechanism for other processes to detect an attempt to open a file, or a call to execute any other action on a file, via hook interface 420. In the embodiment illustrated in FIG. 4, shell extension 228 and application manager 222 use the features provided via hook interface 420 to detect a request to open a file with an extension having no known associations in the physical system environment and modify the behavior seen by the user if the file's extension is associated with an application that is available in a virtual environment, even though the application is not visible to the operating system shell. The following section describes the detailed operation of shell extension 228.

In one embodiment, shell extension 228 may convey a register request 421 to register hook 440 with hook interface 420. In response to receiving register request 421, hook interface 420 may create an entry in registry 410 via register request 422 that corresponds to shell hook 440. Subsequently, hook interface 420 may notify hook 440, or any other process that has been registered for notification, whenever a call is made to perform an action on a file. For example, hook interface may notify hook 440 of such an attempt via notify message 423. In one embodiment, notify message 423 includes information about the file and the action that is being requested for the file. In response to receiving notify message 423, hook 440 may create a worker thread to respond to the notification.

In one embodiment, the worker thread may generate a corresponding notify message 424 to determine if the action that is being requested is an attempt to open a file with a file extension that has no known association. For example, in one embodiment, notify 424 may trigger a method, action filter 451, to determine if the action corresponds to opening a file with a file extension that has no known association. If the action that is being requested is not an attempt to open a file with an extension that has no known association, a return 425 may be conveyed to hook 440 indicating that the action is not supported by the shell extension. In response to receiving return 425, hook 440 may elect to convey a status message to the shell indicating that the shell may continue to perform default processing. If the action that is being requested is an attempt to open a file with a file extension that has no known association, a query 426 may be sent to application manager 222 to attempt to find a file extension association. In response to receiving query 426, application manager 222 may query one or more virtual environments to find an associated application for the file extension. For example, in one embodiment, application manager 222 may utilize search method 470 to issue a query 427 to visibility rules 360. In response to receiving query 427, visibility rules 360 may process query 427 and either issue one or more queries 428 to virtual environments 226 or determine, according to one or more access rules of visibility rules 360, that no virtual environments are accessible to application manager 222. Virtual environment(s) 226 that receive a query 428 may respond with a return 429 indicating whether or not they have an application that has an association with the file extension. A list of environments that have an application that has an association with the file extension may be created. If no virtual environment has an application that has an association with the file extension, an empty list may be created. Application manager 222 may apply one or more selection rules from visibility rules 360 to the list to select an environment in which to open the file. For example, a rule may specify that the environment having the most recently installed application is to be selected.

Alternatively, applications from a particular vendor may be preferred, etc. Application manager 222 may convey a return 430 to hook 440 including information identifying a virtual environment in which an application that can be used to open the file may be found, or indicating that no such virtual environment was found. Hook 440 may, in response to receiving return 430, issue a status message 431 to hook interface 420. Status message 431 may be OK, indicating an application with the desired file extension association was found in a virtual environment, or FALSE, indicating an application with the desired file extension association was not found in a virtual environment and that default processing may continue. If the status indicated by status message 431 is OK, hook 440 may also cause the worker thread to be moved to the identified virtual environment, the action to be executed in the identified virtual environment, and upon completion of the action, the worker thread to be removed from the virtual environment. In an example implementation, hook 440 may use a process move method 453 to move the worker thread by issuing a move command 432 to the identified virtual environment, process execute method 454 to cause the action to begin execution by issuing an execute command 433 to the identified virtual environment, and process remove method 455 to remove the worker thread from the identified virtual environment by issuing a remove command 434 to the identified virtual environment.

In the above description of the operation of shell extension 228 and hook 440, actions are described in terms of the execution of methods as may be defined in object-oriented programming as one example for discussion purposes only. Other implementations including different combination of methods as well as actions implemented in terms of procedural language functions or routines are possible and are contemplated.

Figure 5:
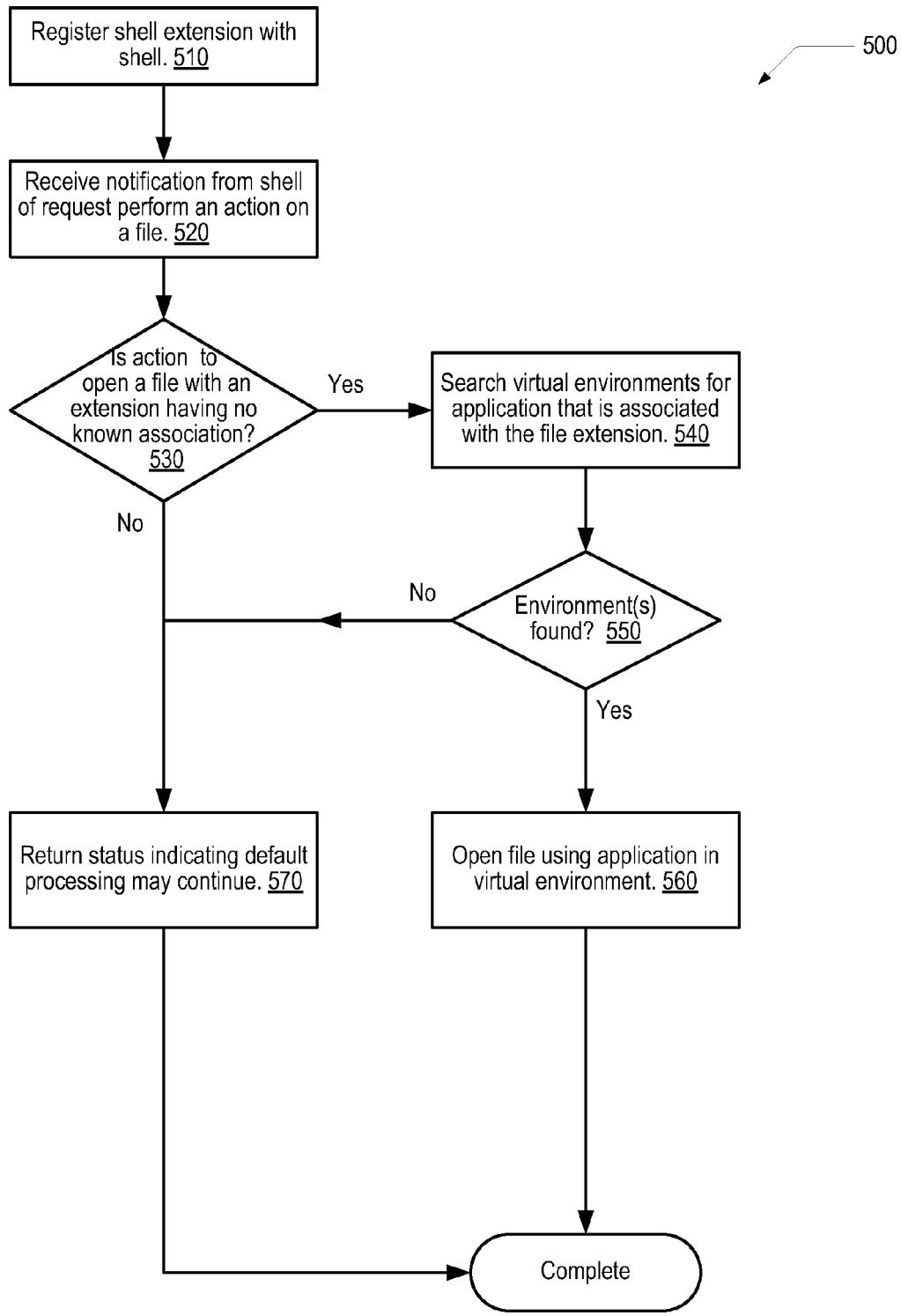
FIG. 5 illustrates one embodiment of a process that may be used to respond to a request to perform an action on a file.

FIG. 5 illustrates one embodiment of a process 500 that may be used to respond to a request to perform an action on a file. Process 500 may begin with a shell extension registering with an operating system shell to receive notifications of attempts to perform any of a variety of actions on a file through the operating system shell (block 510). Once a shell extension has been registered, it may receive a notification from the shell of a request to perform an action on a file (block 520). If the action to be performed is not opening a file that has an extension with no associations known to the shell (decision block 530), a return status may be conveyed to the shell indicating that default processing may continue (block 570), completing process 500. However, if the action to be performed is to open a file that has an extension with no associations known to the shell (decision block 530), one or more virtual environments may be searched for an application that is associated with the file's extension type (block 540). If a suitable application is found (decision block 550), the file may be opened in the virtual environment in which the application was found (block 560), completing process 500. If a suitable application is not found (decision block 550), a return status may be conveyed to the shell indicating that default processing may continue (block 570), completing process 500.

Figure 6:
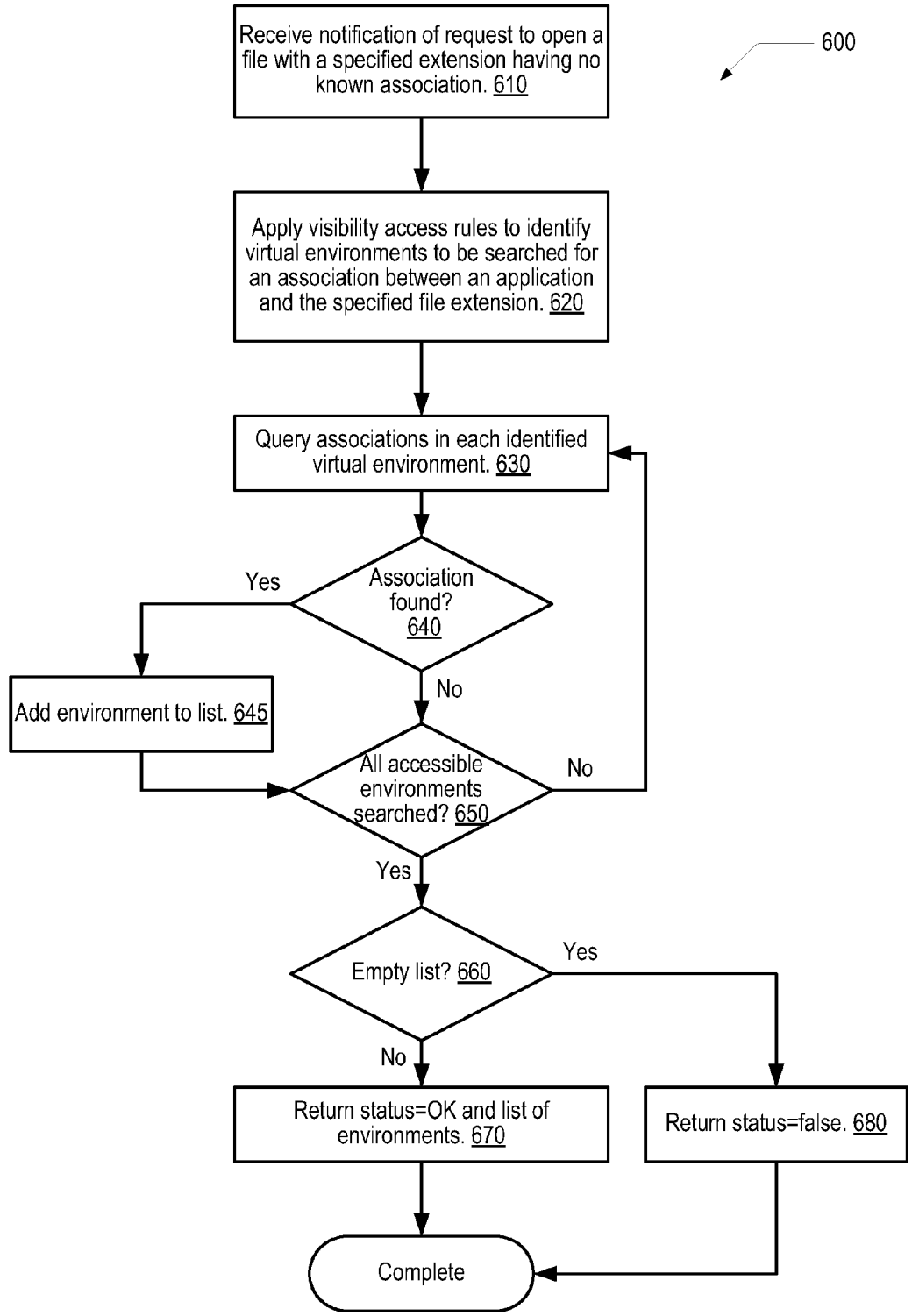
FIG. 6 illustrates one embodiment of a process that may be used to find an application that is associated with a particular file extension.

FIG. 6 illustrates one embodiment of a process 600 that may be used to find an application that is associated with a particular file extension. Process 600 is one example embodiment of block 540 of FIG. 5. Process 600 may begin with receipt of notification of a request to open a file having a specified extension that has no known association (block 610). In response to receiving a notification, one or more visibility access rules may be applied to identify one or more virtual environments to be searched for an association between an application and the specified extension (block 620). Each identified, accessible virtual environment may be queried (block 630). If an association is found in a corresponding virtual environment (decision block 640), the corresponding virtual environment may be added to a list (block 645).

Once a virtual environment has been added to the list, or if no association has been found, if another environment is accessible (decision block 650), it may be queried continuing process 600 at block 630. Once all accessible environments have been queried (decision block 650), if the list is empty (decision block 660), a false status may be returned (block 680), indicating that no suitable virtual environment for opening the file has been found and completing process 600. If the list is not empty (decision block 660), an OK status may be returned (block 670), including the list of suitable virtual environments for opening the file, thereby completing process 600.

Figure 7:
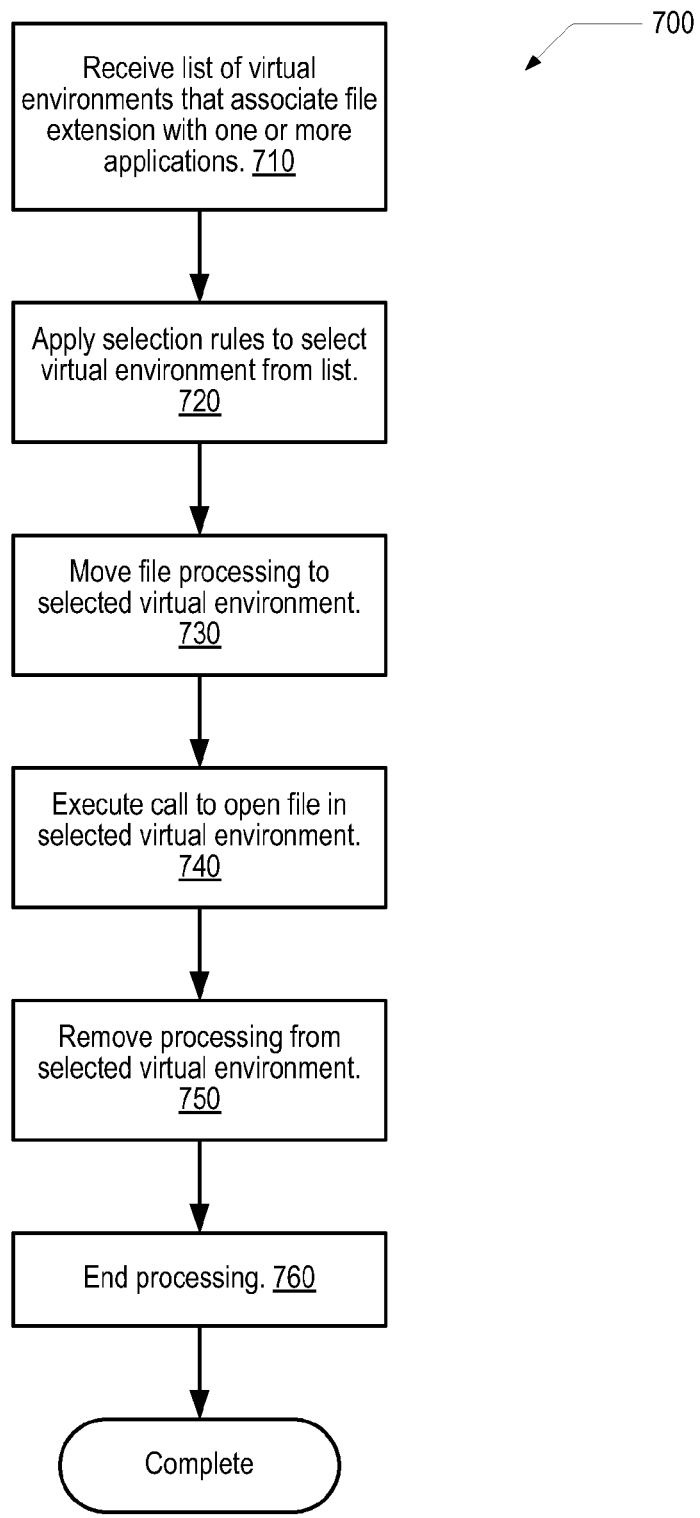
FIG. 7 illustrates one embodiment of a process that may be used to open a file in a virtual environment.

FIG. 7 illustrates one embodiment of a process 700 that may be used to open a file in a virtual environment. Process 700 is one example embodiment of block 560 of FIG. 5. Process 700 may begin with receipt of a list of virtual environments in which a file may be opened (block 710). For example, the list may include one or more virtual environments in which the file's extension is associated with an available application. In response to receiving the list, a set of selection rules may be applied to the list to select a particular virtual environment (block 720). For example, an environment may be selected based on having the most recently installed application for which a file extension association exists. Any of a variety of other selection rules may be applied to select a particular environment. Once a particular environment has been selected, file processing may be moved to the particular environment (block 730). A call to open the file may then be executed in the particular virtual environment (block 740). Once the call has been executed, processing may be removed from the virtual environment (block 750) and processing ended (block 760), completing process 700.

It is noted that the foregoing flow charts are for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. It is intended that the following claims be interpreted to embrace all such variations and modifications.

What is claimed is:

1. A computer system comprising:
   a system environment; and
   an application manager comprising visibility rules;
   one or more virtual environments, each comprising an association table;
   wherein the system environment includes a shell extension configured to detect a request to perform an action on a file in the system environment, wherein in response to detecting the request the shell extension is configured to:
   determine that the action comprises opening the file;
   create a processing thread in the system environment;
   determine the file extension is not associated with any application in the system environment;
   apply said visibility rules to identify particular virtual environments of the one or more virtual environments to be searched for an association between an application and the file extension;
   query association tables in each of the particular virtual environments to determine whether the corresponding virtual environment includes an association between an application and the file extension;
   identify one or more of the virtual environments in which the file extension is associated with an application;
   apply selection rules to select a given virtual environment from the identified one or more virtual environments;
   move the processing thread to the given virtual environment; and
   open the file in the given virtual environment.

2. The system of claim 1, wherein the shell extension is registered with an operating system shell and the operating system shell is configured to convey a notification to the registered shell extension when a request to perform an action on a file is made.

3. The system of claim 2, wherein the operating system shell is configured to:
   delay processing of the request until a return status is received from the registered shell extension; and
   continue processing of the request responsive to receiving an indication from the registered shell extension that indicates an application associated with file extension was not found in the system environment.

4. The system of claim 2, wherein the notification includes first information identifying the file extension and second information identifying the action.

5. The system of claim 3, wherein the operating system shell is further configured to continue processing of the request responsive receiving an indication from the registered shell extension that indicates the action is not an action to open a file.

6. The system of claim 3, wherein the operating system shell is further configured to continue processing of the request responsive receiving an indication from the registered shell extension that indicates the shell extension can not identify a virtual environment in which the extension is associated with an application.

7. A method of virtualizing file extensions in a host computer system, the method comprising:
   detecting a request to perform an action on a file in a system environment, wherein the file has an associated file extension;
   in response to detecting the request:
   determining that the action comprises opening the file;
   creating a processing thread in the system environment;
   determining the file extension is not associated with any application in the system environment;
   applying said visibility rules to identify particular virtual environments of the one or more virtual environments to be searched for an association between an application and the file extension;
   querying association tables in each of the particular virtual environments to determine whether the corresponding virtual environment includes an association between an application and the file extension;
   identifying one or more of the virtual environments in which the extension is associated with an application;
   applying selection rules to select a given virtual environment from the identified one or more virtual environments;

moving the processing thread to the given virtual environment; and opening the file in the given virtual environments.

8. The method of claim 7,
wherein a shell extension is registered with an operating system shell to receive notifications when a request to perform an action on a file is made; and
wherein said detecting a request comprises the shell extension receiving a notification of the request from the operating system shell.

9. The method of claim 8, further comprising the operating system shell:
delaying processing of the request until a return status is received from the registered shell extension; and
continuing processing of the request responsive to receiving an indication from the registered shell extension that indicates an application associated with file extension was not found in the system environment.

10. The method of claim 8, wherein the notification includes first information identifying the file extension and second information identifying the action.

11. The method of claim 9, further comprising the operating system shell continuing processing of the request responsive receiving an indication from the registered shell extension that indicates the action is not an action to open a file.

12. The method of claim 9, further comprising the operating system shell continuing processing of the request responsive receiving an indication from the registered shell extension that indicates the shell extension can not identify a virtual environment in which the extension is associated with an application.

13. A non-transitory computer readable storage medium, wherein the non-transitory computer accessible readable storage medium stores first program instructions executable by a computer system to:
detect a request to perform an action on a file in a system environment, wherein the file has an associated file extension; and
in response to detecting the request:
determine that the action comprises opening the file;
create a processing thread in the system environment;
determine the file extension is not associated with any application in the system environment;
apply said visibility rules to identify particular virtual environments of the one or more virtual environments to be searched for an association between an application and the file extension;
query association tables in each of the particular virtual environments to determine whether the corresponding virtual environment includes an association between an application and the file extension;
identify at least one of the virtual environments in which the extension is associated with an application; and
apply selection rules to select a given virtual environment from the identified one or more virtual environments;
move the processing thread to the given virtual environment; and
open the file in the given virtual environments.

14. The non-transitory computer readable storage medium of claim 13, wherein the first program instructions are further executable by the computer system to register a shell extension with an operating system shell, wherein the operating system shell is configured to convey a notification to the registered shell extension when a request to perform an action on a file is made.

15. The non-transitory computer readable storage medium of claim 14, wherein the operating system shell is configured to:
delay processing of the request until a return status is received from the registered shell extension; and
continue processing of the request responsive to receiving an indication from the registered shell extension that indicates an application associated with file extension was not found in the system environment.

16. The non-transitory computer readable storage medium of claim 14, wherein the notification includes first information identifying the file extension and second information identifying the action.

17. The non-transitory computer readable storage medium of claim 15, wherein the operating system shell is configured to continue processing of the request responsive receiving an indication from the registered shell extension that indicates the action is not an action to open a file.

* * * * *